March 24, 1936.  R. R. OSBORN  2,035,019

COOLING MEANS

Filed Nov. 17, 1933  2 Sheets-Sheet 1

INVENTOR.
ROBERT R. OSBORN.
BY
ATTORNEY.

March 24, 1936.  R. R. OSBORN  2,035,019
COOLING MEANS
Filed Nov. 17, 1933  2 Sheets-Sheet 2
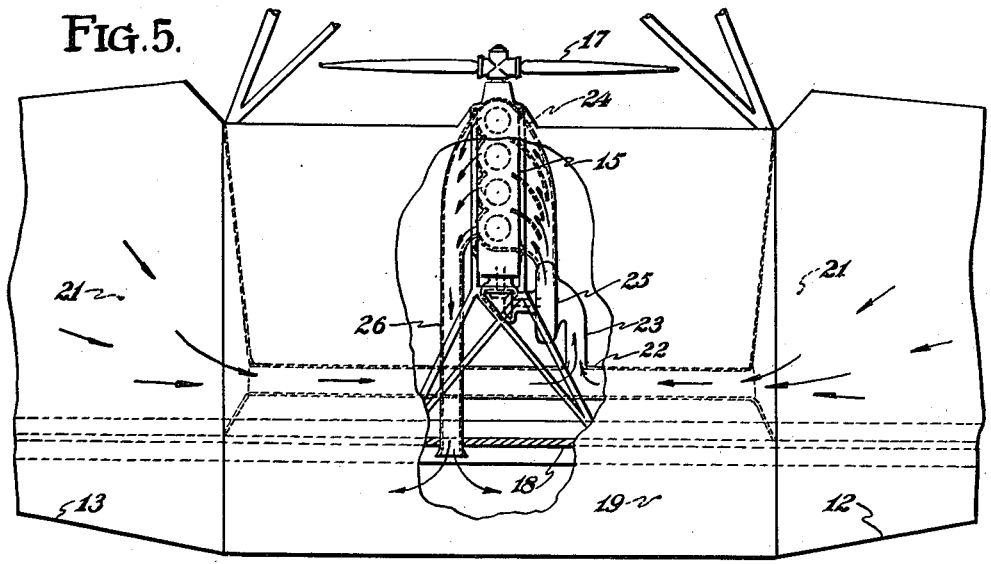
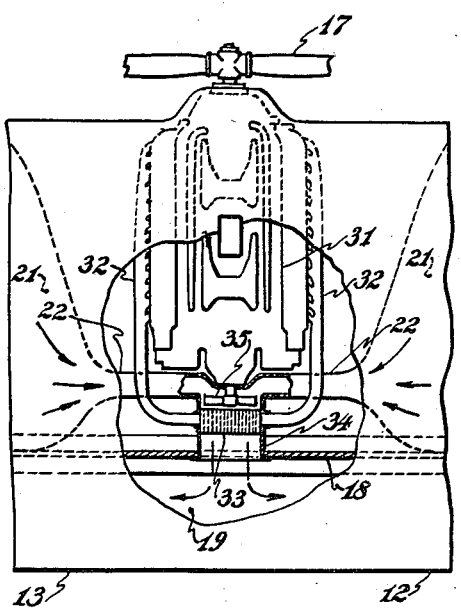
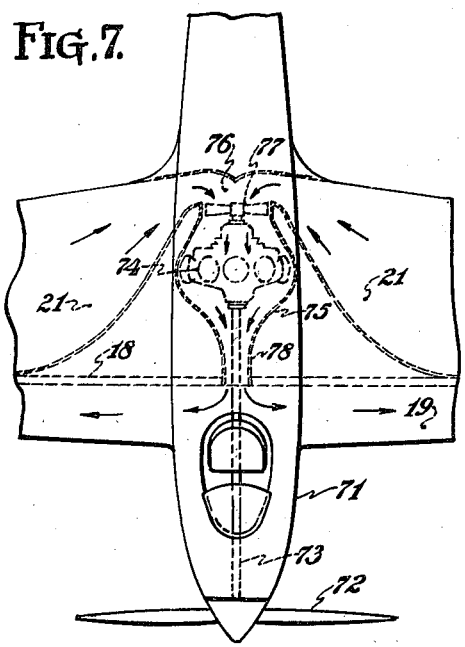
INVENTOR.
ROBERT R. OSBORN.
BY
ATTORNEY.

Patented Mar. 24, 1936

2,035,019

UNITED STATES PATENT OFFICE 2,035,019

COOLING MEANS

Robert R. Osborn, Kenmore, Pa., assignor to Curtiss Aeroplane & Motor Company, Inc., a corporation of New York Application November 17, 1933, Serial No. 698,450

2 Claims. (Cl. 244—31)

This invention relates to aircraft, and particularly to that type of aircraft which utilizes a heat generating power plant for its propulsion and/or sustension. In such power plants, including so-called "air-cooled engines", or so-called "water-cooled engines", a considerable volume of air is utilized for cooling. In the case of a so-called "air-cooled engine", it is cooled by the direct impingement of air on the cylinders thereof, while in the case of the so-called "water-cooled engine", the power plant includes an air-cooled radiator through which the water or cooling liquid passes. Hence, a considerable volume of air is utilized in cooling the radiator, and indirectly, the engine.

An object of the invention is to provide an improved means for controlling the operating temperatures of air-cooled power plants.

A further object of the invention is to provide a closed air cooling system wherein a more or less definite volume of air is circulated and recirculated through the power plant system and through certain portions of the aircraft.

A further object is to utilize the wings of an airplane for reducing the temperature of cooling air after it has been warmed by contact with the airplane power plant.

A still further object of the invention is to warm certain portions of the airplane wings by the passage therethrough of air previously warmed by the power plant.

The last named object gives a very beneficial effect in the operation of the airplane, since, when certain portions of the aircraft wings are kept relatively warm, the formation of ice or sleet on the wings is prevented.

It is well known that the formation of sleet and ice on aircraft wings is a grave hazard, and many devices have been evolved to prevent their occurrence. Most of the prior devices have involved a rather complex structure—some have contemplated passing exhaust gas from the engine to ducts in the wings, but this is impractical, due to the fire hazard involved. If the wings were constructed of relatively fire-proof material, their weight would be so increased as to make the airplane impractical. With the system herein disclosed, the warm air used for cooling the engine is not sufficiently hot to cause any fire hazard, and yet, it may be moved in sufficient volume through the wings to effect considerable transfer of heat to the wing surfaces, whereby the critical points at which ice or sleet form may be avoided. It is an accepted fact that the critical temperatures at which ice may form are from approximately 28° to 36°. If the wings can be kept either above or below these temperatures, the hazard of ice formation is minimized. It may also be determined by calculation and test, that the amount of heat given up by an internal combustion engine to its coolant will be sufficient under all ordinary circumstances of operation to maintain the wings at a temperature above the range mentioned.

More particularly, I provide an engine completely housed within the fuselage or body of an airplane, the drive shaft thereof being extended either ahead of or behind the fuselage, so that a propeller may be mounted thereon for propulsion of the airplane. I provide a system of conduits and ducts within the fuselage to direct cooling air against the engine cylinders or, in the case of a water-cooled engine, against the water cooling radiator which forms a part of the power plant. The air which leaves the engine or the radiator is conducted through suitable ducts to the interior of the leading edge portion of the airplane wings, whence it is driven laterally through the leading edge toward the tips. This warm air is held within the confines of the leading edge by means of a suitable partition extending laterally within the wing. Openings in the partition toward the wing tips allow the air to pass to the rear or central portions of the hollow wing, whence it may return to the fuselage or body to be again driven against the engine cylinders or the radiator. In its passage through the wings, the cooling air, while warming the wings, gives up the heat which it has absorbed from the engine, so that, when the air again reaches the engine it is sufficiently cool to effect proper cooling of the power plant. It will be realized that the large expanse of wing area in an airplane provides adequate radiating surface for the cooling air.

An additional and important gain accruing from my invention is that the airplane engine is completely housed within the streamlined confines of the body, so that the parasite drag of the airplane is reduced, permitting of greater speed.

Further objects and advantages in the invention will be apparent from an examination of the drawings and from a consideration of the claims and the more detailed description following.

In the drawings:

Figs. 5 and 6 are fragmentary plans, partly broken away, showing alternative embodiments of the invention; and Fig. 7 is a fragmentary plan showing still another alternative of the invention.

Figure 1:
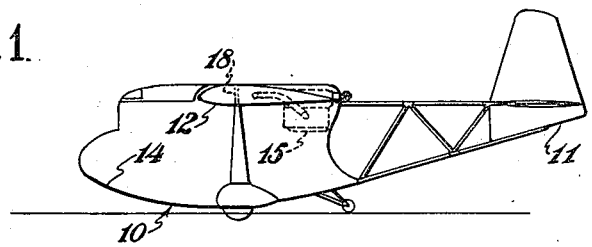
Fig. 1 is a side elevation of an airplane embodying the principles of my invention.
Figure 2:
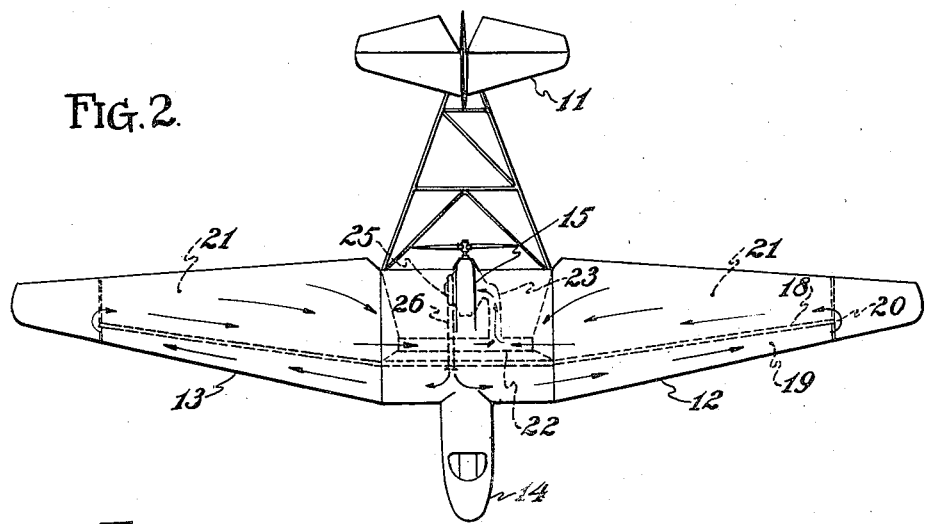
Fig. 2 is a plan of the airplane.
Figure 3:
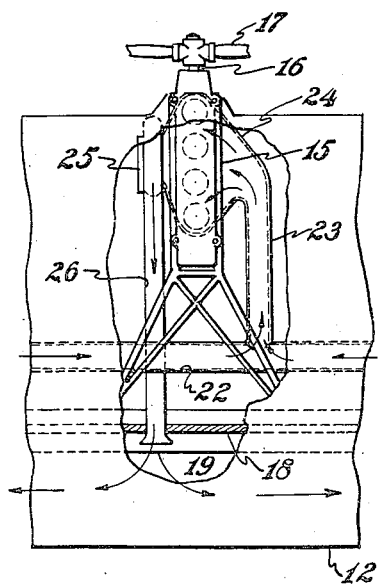
Fig. 3 is an enlarged plan, partly broken away, of a portion of Fig. 2.
Figure 4:
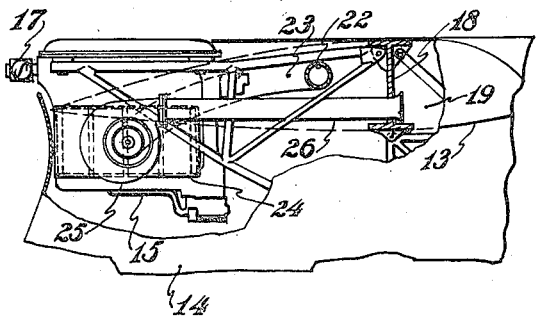
Fig. 4 is an enlarged side elevation, partly broken away, of a portion of the airplane and its power plant.

Referring particularly to Figs. 1 to 4, an airplane 10 comprises an outrigger empennage 11, wings 12 and 13 and a fuselage 14 for accommodation of the crew. In the rearward end of the fuselage 14, a power plant 15 is mounted, said power plant having a rearwardly extending shaft 16 carrying a propeller 17. Each wing 12 and 13 is provided with a laterally extending partition 18 extending from the upper to the lower surface of the wing, defining a duct 19 adjacent the leading edge of the wing. The partition 18 may conveniently be a normal structural part of the wing, such as the forward spar. The partition 18 is interrupted toward the tip, as at 20, or may be provided with openings, to permit of a continuous open passage through the wing tip, and thence to the rear of the partition 18, thereby defining a duct 21 rearward of the partition 18 and between the upper and lower boundaries of the wing.

A conduit 22 joins the ducts 21 of each wing, and is provided with a branch 23 communicating directly with an enclosure 24 surrounding the engine. On the opposite side of the engine, an engine driven blower 25 is arranged, having an outlet conduit 26 communicating with the leading edge duct 19. In operation, when the engine is started, air is drawn through the conduits 22 and 23 from the rearward duct 21 in the wing, and around the engine cylinders by the action of the blower. The air is heated by its contact with the engine cylinders, and is then driven forwardly through the conduit 26 to the leading edge ducts 19 in the wings. As the air passes within the ducts of each wing, it gives up a considerable portion of its heat through the wing covering, thereby becoming cooled. The cooling air then passes around the ends of the partitions 18 to the ducts 21 and is again drawn through the conduits 22 and 23 to cool the engine. It will thus be seen that a continuous circuit of cooling air is maintained when the engine is in operation. In a system of this kind, vents to the external atmosphere would be provided at strategic points to permit of the escape of air which has increased in volume by becoming warm, or conversely, to permit the induction of new air, should the pressure of air within the system become less than atmospheric by virtue of contraction when the air in the system cools off.

In the embodiment shown in Fig. 5, the elements of the system are substantially identical with that just described, except that the blower 25, instead of sucking air through the engine, positively blows the air thereagainst. In other words, the blower 25 is connected directly with the conduit 23, and the warm air duct 26 is connected directly with the engine compartment 24. This embodiment might be slightly preferred, since the air passing the engine under positive pressure is of greater density, and is capable of absorbing a greater amount of heat. Other details of the embodiment of Fig. 5 are identical with those previously described, including the leading edge duct 19 through which warm air from the engine is passed, and the duct 21 in the central or trailing portion of the wing, into which air from the duct 19 may pass.

Fig. 6 shows the invention applied to the power plant including a liquid cooled engine 31, the liquid jackets of which are connected by manifolds 32 to a radiator 33. A chest 34 is provided at one end of the engine to enclose the radiator 33, and a blower 35 is also arranged within the chest and is driven by the engine, to effect a positive circulation of air through the radiator. The suction side of the chest 34 is connected to the conduits 22 which communicate as previously described, with the wing ducts 21. The pressure side of the chest 34 is directly connected with the leading edge wing duct 19. Thus, the action of the cooling system in this embodiment is identical with that previously described, except that the radiator 33 is the direct source of heat for warming the cooling air, whereas previously, such air impinged directly on the engine cylinders.

Fig. 7 shows my invention applied to a tractor type airplane 71, having a tractor propeller 72 driven through a shaft 73 by a radial air-cooled engine 74 located wholly within the fuselage. The engine 74 is completely surrounded by a cowling 75 having an axial air entrance duct 76 communicating with the central or trailing edge ducts 21 in the wings. A blower 77 driven by the engine, forces air to pass through the cowling 75 and over the engine cylinders, whence it may pass through an axial conduit 78 into the hollow leading edge ducts 19 of the wings. The embodiment of the invention shown in Fig. 7 is the same in principle as that previously described, and simply shows its adaptability to a variant type of aircraft power plant.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In aircraft, in combination, an enclosed air-cooled heat generating engine therein, a hollow wing having a transverse partition dividing the interior of said wing into a leading edge compartment and a rear compartment, both said compartments comprising substantially the full thickness of said wing, means connecting said engine closure with said leading edge compartment, means connecting said closure with said rear compartment, and means for forcing an air cooling blast over said engine, through said leading edge compartment, through said rear compartment, and again over said engine, said partition having openings for the flow of air therethrough toward the outer end of said wing.

2. In aircraft, a hollow wing having a spanwise partition extending from the wing root toward the wing tip, said partition defining with the wing covering a leading edge duct forward of the partition and a duct rearward thereof, means establishing communication between said ducts adjacent the wing tip, a body in said aircraft, an engine adapted to be cooled by air, completely housed within said body, by which the drag occasioned by an exposed engine is eliminated, ducts establishing communication between the respective wing ducts and said engine, and means for circulating cooling air past said engine, through said several ducts and back to said engine, said cooling air, in its flow through said wing ducts, passing along the inner surfaces of the wing covering by which heat transference is effected between the circulating air and the ambient air passing over the outer wing surfaces.

ROBERT R. OSBORN.